June 2, 1925.

K. P. MALON

PRESS

Filed Jan. 6, 1923

Witnesses:

Inventor:
Katheryne P. Malon
By Joshua R H Roth
Her Attorney

June 2, 1925.

K. P. MALON 1,540,353

PRESS

Filed Jan. 6, 1923

Witnesses:

Inventor:
Katheryne P. Malon
By Joshua R. H. Potts
Her Attorney

June 2, 1925.                                          1,540,353
K. P. MALON
PRESS
Filed Jan. 6, 1923          3 Sheets-Sheet 3

Witnesses:

Inventor:
Katheryne P. Malon
By Joshua R. H. Potts
Her Attorney

Patented June 2, 1925.

1,540,353

UNITED STATES PATENT OFFICE.

KATHERYNE P. MALON, OF CHICAGO, ILLINOIS, ASSIGNOR OF ONE-HALF TO JOHN B. BERRIGAN, OF CHICAGO, ILLINOIS.

PRESS.

Application filed January 6, 1923. Serial No. 610,956.

*To all whom it may concern:*

Be it known that I, KATHERYNE P. MALON, a citizen of the United States, and a resident of the city of Chicago, county of Cook, and State of Illinois, have invented certain new and useful Improvements in Presses, of which the following is a specification.

My invention relates to improvements in presses, and more especially to filtering means for filtering liquids expressed by said presses, the object of the invention being to provide a simple and effective arrangement of this character which is of simple construction and efficient in operation, the present invention being an improvement on that set forth in my prior application, filed January 23, 1922, Serial No. 531,280.

Other objects will appear hereinafter.

The invention consists in the combinations and arrangements of parts hereinafter described and claimed.

The invention will be best understood by reference to the accompanying drawings, forming a part of this specification, and in which, Fig. 1, is a partial side view of a portion of a hydraulic press embodying the invention;

Figure 1:
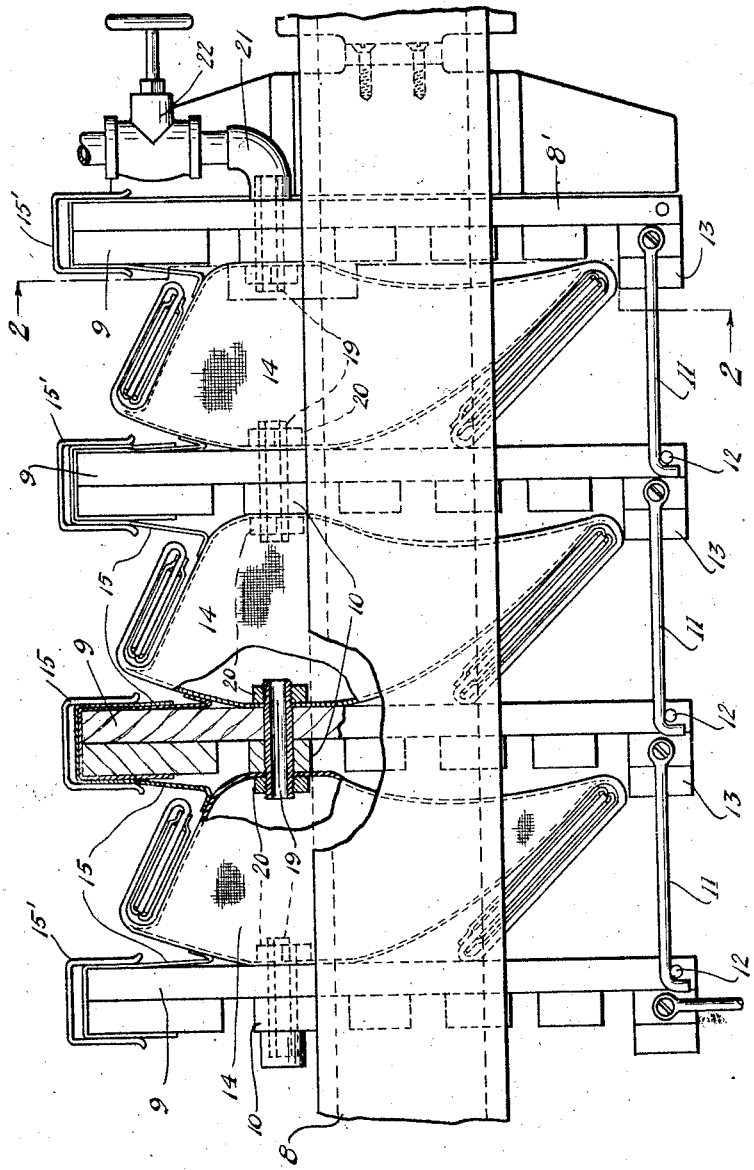
Figure 2:
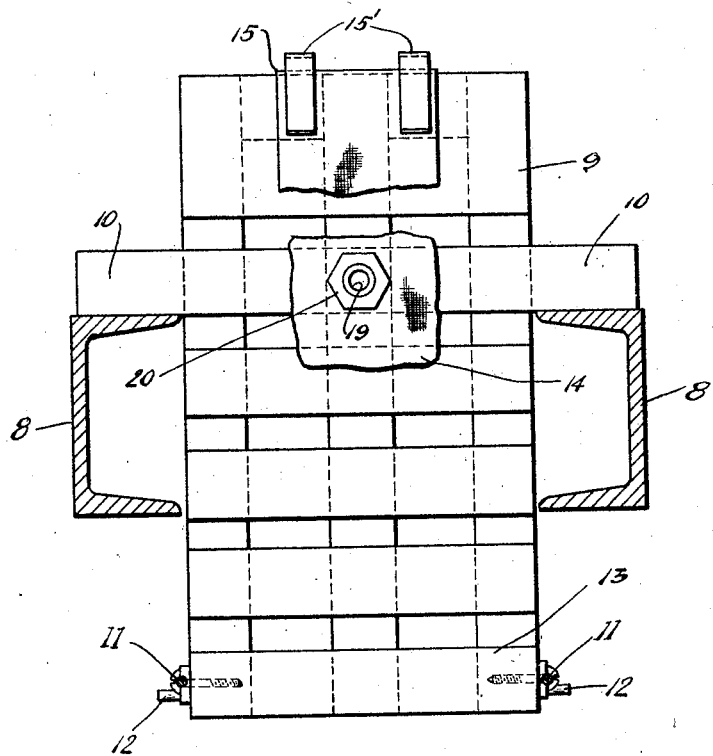
Fig. 2, is a transverse section of the same taken substantially on line 2—2 of Fig. 1.
Figure 3:
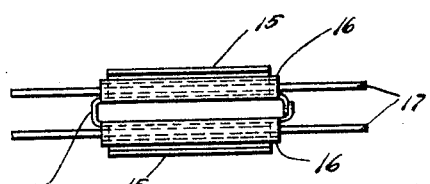
Fig. 3, is a top plan view of a filter bag employed in the construction.
Figure 4:
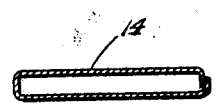
Fig. 4, is a transverse section of said filter bag taken on line 4—4 of Fig. 5.
Figure 5:
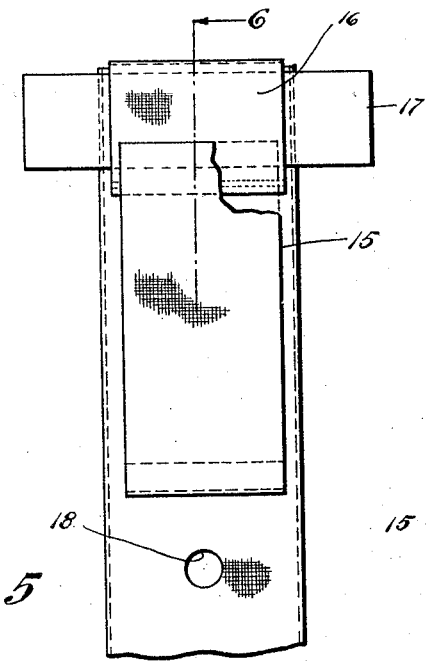
Fig. 5, is an enlarged partial side view of one of said filter bags.

The preferred form of construction as illustrated in the drawings comprises the usual horizontal hydraulic press having the usual side bars 8 and abutment 8' with the usual pressure frames 9 arranged as indicated, each frame 9 being formed of vertical and horizontal slats as shown, one horizontal slat 10 being extended laterally to rest upon the side bars 8 as best indicated in Fig. 2. So much of the construction is an old and well known form of construction employed in such presses for expressing liquid matter from meal, ground meat or the like and forms no part of my present invention, except in so far as the same cooperates with other features to be presently described.

Each of the pressure frames 9 is provided at the bottom on opposite sides with hooks 11 adapted to detachably engage pins 12 on the adjacent frame and whereby said frames may be readily positioned in the press in spaced relation with each other. Each of the pressure frames 9 is also provided at its bottom with a horizontal cross slat 13 forming a supporting ledge as indicated and a cloth filter bag 14 is arranged between each pair of pressure members 9 and between the end pressure member and the abutment 8'. Each filter bag is made tubular in form and open at both top and bottom, being provided adjacent the top on each side with suspending straps 15 by means of which the bag may be readily secured in place between two of the pressure frames 9, said straps being in turn detachably secured to the tops of the pressure frames or abutment by means of metallic clips 15' as shown. At both top and bottom, each bag is provided with backwardly turned flaps 16 forming loops as shown for the reception of stiffening plates 17 arranged in said loops across opposite sides of the bag.

Each bag is provided with an opening 18 in each side thereof, said openings being adapted and arranged to fit over threaded tubes 19 extending through the pressure frames and abutment. Nuts 20 serve to secure the bags in place on said tubes as indicated and whereby open communication is established between the bags. The tube 19 which extends through the abutment 8' is connected with a filling pipe 21 having a suitable valve 22 therein as shown and whereby material to be pressed may be forced into said bags under pressure.

In use each bag has its open ends folded or wrapped around the corresponding stiffening plates as indicated, the lower plates being supported on the corresponding strips 13 as shown, the hooks 11 being utilized to hold the pressure members 9 in proper spaced relation as indicated. The bags are all then filled by forcing the material, such as cotton-seed meal or the like into them through the pipe 21 and the valve 22 is then closed. Then the press is operated to force the frames 9 toward each other and toward the abutment 8' thus compressing the matter in the bags 14 and forcing the liquid through the walls of the bag. When the liquid has thus been completely expressed and it is desired to discharge the matter from the bags 14 the press is operated to relieve the pressure and the pressure frames 9 separated sufficiently to permit the lower plates 17 to fall or tumble from the supporting strips 13 thus automatically opening the bags and permitting of the discharge of the exhausted material. Should there be any clinging of the material in the bags the upper ends thereof may be opened and a paddle or the like inserted to discharge the material. When any of the bags are torn, burst or become defective for any reason, they may be readily replaced by removing the nuts 20. I have illustrated but a few of the bags but it is to be understood that usually a considerable number of said frames and bags will be employed. In this matter a simple and effective arrangement is provided by means of which large quantities of material may be handled in a simple, efficient and economical manner.

Figure 7:
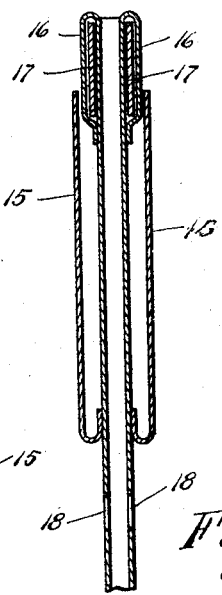
Fig. 7, is a detailed sectional view taken through the top of a modified form of filter bag.
Figure 6:
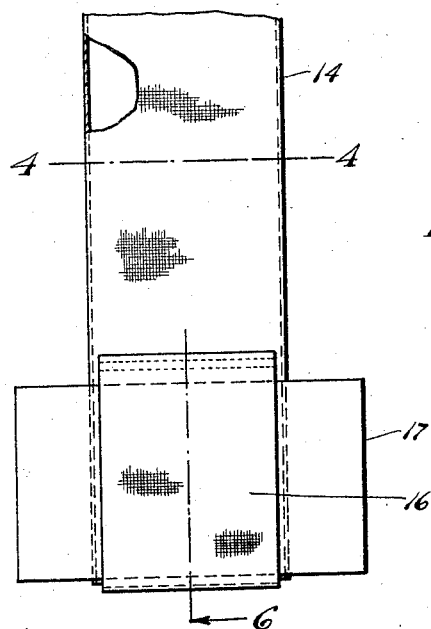
Fig. 6, is a section taken on line 6—6 of Fig. 5.
Figure 6:
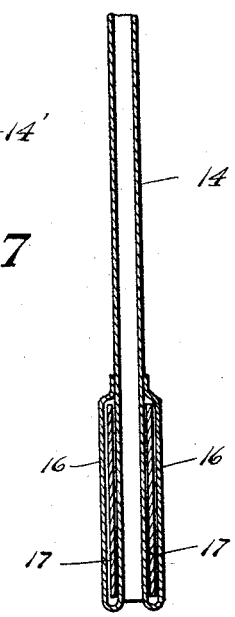

In Fig. 7, I have illustrated a modified form of a bag 14' in which the upper end thereof is made permanently closed. This form of bag has the advantages of affording somewhat larger filtering surface and requiring no attention to see that the top is closed. The disadvantages of this form of bag are that it does not afford ready access for the discharge of cleaned material or replacement of the bags.

While I have illustrated and described the preferred forms of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A press comprising adjoining pressure members; filter bags inserted between said members, there being open communication between said bags; each bag having an end automatically openable upon release of pressure upon said bag and means for forcing material to be pressed into one of said bags.

2. A press comprising adjoining pressure members; filter bags inserted between said members, there being openings extending through adjoining sides of adjoining bags; each bag having an end automatically openable upon release of pressure upon said bag and means for forcing material to be pressed into one of said bags.

3. A press comprising pressure members; tubes extending through said members; filter bags inserted between said members, there being openings in the sides of said bags fitting over said tubes and said bags being secured to said tubes; and means for forcing material to be compressed into one of said bags.

4. A press comprising adjoining pressure members; tubes extending through said members; filter bags inserted between and suspended on said members, there being openings in the sides of said bags fitting over said tubes and said bags being secured to said tubes; means for forcing material to be compressed into one of said bags.

5. A press comprising adjoining pressure members, tubes extending through said members, the ends of said tubes being threaded; filter bags inserted between said members, there being openings in the sides of said bags fitting over said tubes; nuts on the ends of the said tubes securing said bags in place; and means for forcing material to be compressed into one of said bags.

6. A press comprising an abutment member and adjoining pressure members; tubes extending through said members; filter bags inserted between said members, there being openings in the sides of said bags fitting over said tubes; nuts threaded on said tubes and securing said bags in place; suspension straps secured to the opposite sides of said bags and detachably secured to said members; and a valved filling pipe secured to the tube extending through said abutment member.

7. A press comprising adjoining pressure members; filter bags inserted between said members, there being open communication between said bags and each bag being provided with a bottom automatically opening upon release of pressure upon said bag and means for forcing material to be pressed into one of said bags.

8. A press comprising adjoining pressure members; filter bags inserted between said members, there being open communication between said bags and each bag being open at the bottom, said bottom being folded upon itself to seal under pressure and to open automatically upon release of pressure upon said bag; and means for forcing material to be pressed into one of said bags.

9. A press comprising adjoining pressure members; filter bags insertable between said members, there being open communication between said bags and each bag being provided at both top and bottom with an end openable upon release of pressure upon said bag and means for forcing material to be pressed into one of said bags.

10. A press comprising adjoining pressure members; filter bags inserted between and inserted on said pressure members, there being openings extending through adjoining sides of adjoining bags and each bag being provided at both top and bottom with an end openable upon release of pressure upon said bag; and means for forcing material to be pressed into one of said bags.

In testimony whereof I have signed my name to this specification in the presence of two subscribing witnesses.

KATHERYNE P. MALON.

Witnesses:
 FREDA C. APPLETON,
 LOUISE E. SYNWALT.